(12) United States Patent
Adatia

(10) Patent No.: US 8,639,611 B2
(45) Date of Patent: Jan. 28, 2014

(54) AUTOMATED SECURITIES TRADE EXECUTION SYSTEM AND METHOD

(75) Inventor: Asif Adatia, London (GB)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 13/540,536

(22) Filed: Jul. 2, 2012

(65) Prior Publication Data
US 2012/0271753 A1      Oct. 25, 2012

Related U.S. Application Data

(63) Continuation of application No. 12/891,263, filed on Sep. 27, 2010, now Pat. No. 8,214,282, which is a continuation of application No. 09/841,388, filed on Apr. 24, 2001, now Pat. No. 7,827,087.

(51) Int. Cl.
*G06Q 40/00* (2012.01)

(52) U.S. Cl.
USPC .............................................. 705/37; 705/38

(58) Field of Classification Search
USPC .............................................. 705/35–40, 29
See application file for complete search history.

(56) References Cited

U.S. PATENT DOCUMENTS

| | | | |
|---|---|---|---|
| 5,734,837 A | 3/1998 | Flores et al. | |
| 5,794,207 A | 8/1998 | Walker et al. | |
| 5,893,076 A | 4/1999 | Hafner et al. | |
| 6,049,783 A | 4/2000 | Segal et al. | |
| 6,055,519 A | 4/2000 | Kennedy et al. | |
| 6,199,050 B1 | 3/2001 | Alaia et al. | |
| 6,269,343 B1 | 7/2001 | Pallakoff | |
| 6,532,460 B1 | 3/2003 | Amanat et al. | |
| 7,110,969 B1 * | 9/2006 | Bennett et al. | 705/35 |
| 7,353,194 B1 * | 4/2008 | Kerker et al. | 705/29 |
| 2001/0032165 A1 | 10/2001 | Friend et al. | |
| 2001/0034693 A1 | 10/2001 | Farhat et al. | |
| 2002/0152152 A1 | 10/2002 | Abdelnur et al. | |
| 2003/0018558 A1 | 1/2003 | Heffner et al. | |

* cited by examiner

*Primary Examiner* — Thu Thao Havan
(74) *Attorney, Agent, or Firm* — Perkins Coie LLP

(57) ABSTRACT

An automated securities order execution system includes order entering means for a client to enter an order and at least one filtering means for determining whether the order can be automatically executed. Routing means are used for routing the order to a destination based upon the determination made by each of the filtering means. After the order has been properly routed, the order is executed and the result of the order execution is reported to the client.

20 Claims, 7 Drawing Sheets

AUTOMATED SECURITIES TRADE EXECUTION SYSTEM AND METHOD

CROSS REFERENCE TO RELATED APPLICATIONS

This application is a continuation of U.S. patent application Ser. No. 12/891,263, filed Sep. 27, 2010, entitled "Automated Securities Trade Execution System And Method," now allowed, which is a continuation of U.S. patent application Ser. No. 09/841,388, filed Apr. 24, 2001, entitled "Automated Securities Trade Execution System And Method," issued as U.S. Pat. No. 7,827,087 on Nov. 2, 2010, both of which are incorporated herein by reference in their entirety.

FIELD OF THE INVENTION

The present invention relates to a system and method for automatically executing securities trades based upon a series of user-definable rules.

BACKGROUND OF THE INVENTION

Under existing equities trading systems, a trader needs to review every order, including small orders, and make a decision as to whether to send the order to an exchange or to fill the order from the inventory of the brokerage. For certain orders, for example where the client has asked for a limit order, the trader would need to review the order and perform an action on it. While this arrangement provides for accurate order placement, it lengthens the time between when the order is placed and when the order is filled due to the review process undertaken by the trader.

In an environment where market movements may be large and rapid, short execution times are critical in obtaining the best possible price for a trade. Combine the rapidly-moving markets with computer-enabled order placement, and customers desire (and often expect) to have their orders executed as soon as possible after being placed. By requiring the trader to manually review each order and make a decision thereon, the execution time of the order is inherently slow. It is therefore desirable to shorten the time between when an order is placed and when the order is executed. The system and method of the present invention are designed to overcome the limitations in the prior art.

SUMMARY OF THE INVENTION

By using the system and method of the present invention, a trader can set some basic rules for all orders, so that the trader does not need to take any action on an order if it meets the pre-defined criteria. If the order fails to meet the criteria, then the trader will directly act upon the order; otherwise, all orders will be automatically processed which will shorten execution time. The system is most effective with small orders which are easily filled. By freeing up some of the trader's time, he or she can concentrate on the larger orders that are more difficult to fill.

An order that is entered into the system of the present invention can be handled in one of three ways: (1) worked by the trader in the same manner as a typical telephone order; (2) automatically filled from the brokerage's inventory; or (3) automatically forwarded to a trading exchange to be filled. An order will be automatically processed only if certain pre-defined criteria are met. This is accomplished by passing an order through a series of filters; if the order passes through all the filters, then it will be automatically processed. If an order does not meet all of the filters, it will be passed out of the filter loop to a trader to be manually processed.

An automated securities order execution system according to the present invention includes order entering means for a client to enter an order and at least one filtering means for determining whether the order can be automatically executed. After the filtering means have been applied, routing means will route the order to a destination based upon the determination made by the filtering means. Next, executing means will carry out execution of the order and reporting means will report the result of the order execution to the client.

A method for automatically executing a securities trade according to the present invention includes the steps of first creating at least one filter and then entering an order for a security by a client. Next, each filter is applied to the order to determine whether the order can be automatically executed. The order is then routed to a destination based upon whether the order can be automatically executed. The order will be executed and the results of the trade are reported to the client.

BRIEF DESCRIPTION OF THE DRAWINGS

For a better understanding of the present invention, reference is made to the following detailed description of an exemplary embodiment considered in conjunction with the accompanying drawings, in which.

DETAILED DESCRIPTION OF THE INVENTION

Figure 1:
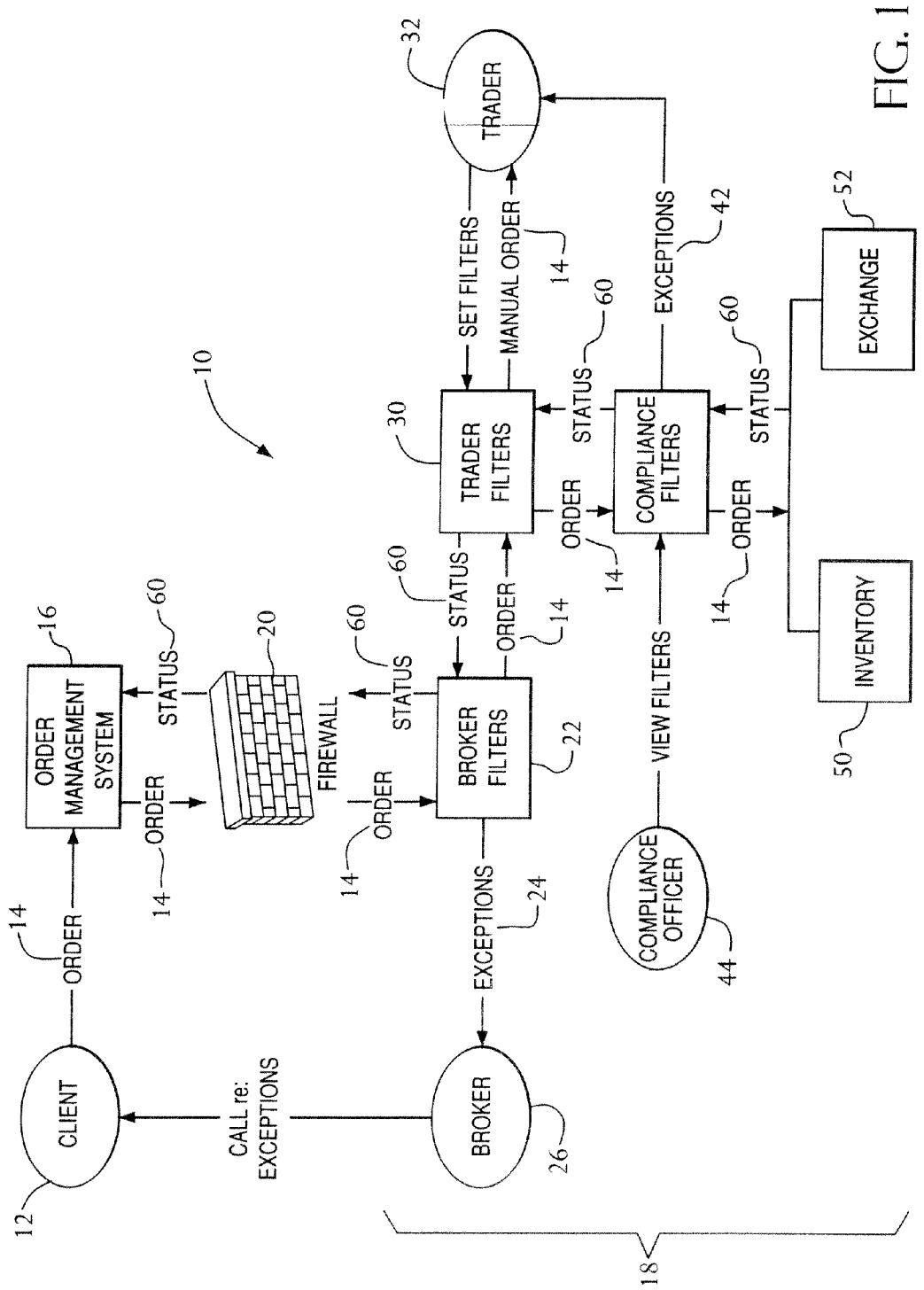
FIG. 1 is a diagrammatical overview of the system of the present invention.

FIG. 1 shows a diagrammatic overview of an automated trade execution system 10 constructed in accordance with the present invention. A client 12 places an order 14 via an order management system 16. The order 14 enters a brokerage's internal systems 18 via a firewall 20. The firewall 20 provides the usual types of protection expected when using a firewall, such as protection of the brokerage's internal systems 18 and client validation, to ensure that only authorized clients 12 can access the brokerage's internal systems 18. To protect the client 12 and the security of an order 14, an order is encrypted by the order management system 16 before being sent through the firewall 20.

The order management system 16 can be of any type desired by the client 12, provided that the order management system 16 can communicate with the brokerage's internal systems 18. The order management system 16 can operate on an unillustrated communications device such as a conventional personal computer or a wireless access device such as a personal digital assistant, and over a suitable communications network to access the brokerage's internal systems 18. By way of illustration but not limitation, when communicating with a particular brokerage, the order management system 16 may need to be capable of sending a FIX protocol message to the brokerage's internal systems 18. FIX or Financial Information Exchange protocol is a messaging standard developed specifically for the real-time electronic exchange of securities transactions and is a public-domain specification owned and maintained by FIX Protocol, Ltd. It will be understood that different message protocols may be required to enable communication between the order management system 16 and other brokerages.

In a fully automated embodiment, the trade execution system 10 is preferably configured with appropriate proprietary or commercially available software suitable to enable direct interaction with a client 12. Preferably, the system 10 is highly scalable, whereby any number of clients may be readily connected to and simultaneously submit orders to the system. Further, the system architecture may be portable and capable of being run on a variety of software platforms such as Windows®, UNIX®, etc.

The system 10 may comprise a flexible and adaptable client-server architecture that employs any suitable object-oriented programming language such as, for example, Java® or C++. The system 10 may also operate on any electronic communication network capable of enabling interactive participation by users of the system. Examples of communication networks that may support the system 10 include the Internet, a proprietary network, a local or wide area network, a wireless network, a telephone network, etc. By way of illustration but not limitation, the system 10 may be a World Wide Web (Web) based system functioning on the Internet.

The system 10 further includes a communication network services integrator appropriate for the communication network within which the system is implemented. For example, in a Web based environment, a suitable communication network services integrator may be the user interface, program logic, data server, and Web server applications marketed by Oracle Corp. of Redwood Shores, Calif.

The order 14 first passes through a series of broker filters 22, which evaluate items such as a credit check on the client 12 to determine whether the order 14 can be covered, whether the order 14 is for a restricted security, or whether the order 14 has exceeded any limits placed on the client's account. The types of checks applied by the broker filters 22 can include any check to validate whether an order 14 can be processed. If the order 14 does not clear all of the broker filters 22, an exception 24 is generated which is passed, along with the order 14, to a broker 26. The broker 26 will then contact the client 12 regarding the exceptions 24 to attempt to resolve the problem. Once the order 14 has been rejected, the client 12 may resubmit the order 14 by re-entering it in the same way as the original order. However, if the order 14 has been rejected on, for example, credit grounds, then it is unlikely to succeed until the credit limit has been altered (e.g., raised) or otherwise addressed.

The broker filters 22 are pre-defined by the rules of the brokerage and cannot be modified by the client 12. Other types of broker filters 22 can include whether the order 14 is a standard market order or a limit order, whether the execution instructions on the order 14 are "held" (meaning that the trader has no discretion in filling the order) or "not held" (meaning that the trader can exercise discretion in filling the order; this is the default setting when used), whether the order 14 is for regular settlement in the normal trading currency, and whether there are any special instructions associated with the order 14.

If the order 14 clears all of the broker filters 22, it is passed to a series of trader filters 30 which will determine whether the order 14 is automatically processed, whether a trader 32 will need to manually fill the order 14, or whether the trader 32 will need to manually send the order 14 to an exchange.

The trader filters 30 include the types of checks a trader 32 would use in evaluating an order 14 and deciding the best method of filling the order 14. For example, the trader filters 30 can include items such as volume of the order 14 in terms of the number of shares involved, the value of the order 14, any limit price on the order 14, and the current price spread of the product. The trader filters 30 will be discussed in greater detail below in connection with FIG. 2.

If an order 14 does not clear any one of the trader filters 30, it will be passed to a trader 32 to be manually processed. The trader filters 30 may be individually active or inactive, but an order 14 must pass through all of the active trader filters 30 to be automatically processed. The number of orders 14 that will be manually handled by the trader 32 is dependent upon the number of trader filters 30 that are set, the criteria of each of the trader filters 30, and the types of orders that the trader 32 normally receives. Each trader 32 has the ability to set the criteria for his or her own trader filters 30, as will be discussed below in connection with FIG. 2. Ideally, the trader filters 30 will accept smaller orders 14 (in terms of both volume and value) and will only pass larger or unusual orders 14 to the trader 32 for manual processing.

If an order 14 meets the requirements of all of the trader filters 30, it will be passed to a set of compliance filters 40. The compliance filters 40 are used to determine if the order 14 can be filled based upon the governing market rules. For example, a determination is made whether the order 14 is of a minimum volume (i.e., no odd-lot trades), whether the price of the order 14 is within a specified percentage of the market price, or whether the security is presently suspended from trading. Additional compliance filters 40 can be added when necessary to meet specific compliance concerns. The compliance filters 40 are dictated by the local market rules, and cannot be modified by either the brokers 26 or the traders 32.

If the order 14 fails any of the compliance filters 40, an exception 42 will be generated, and the order 14 along with the exception 42 will be passed to the trader 32 for manual processing. A human compliance officer 44 can view the compliance filters 40 in operation, to determine what number of orders 14 meet or fail the criteria set. If the order 14 passes all of the compliance filters 40, and depending on the action status of the relevant rule, it will be forwarded to be automatically filled from inventory 50 of the brokerage or directed to an appropriate trading exchange 52. At present, it is believed that only human compliance officers are able to monitor the compliance filters 40. However, at such time that automated/electronic transaction compliance technology is developed that partially or completely performs the functions of a human compliance officer, it will be understood that such technology may be used in the automated trade execution system 10 of the present invention.

To be able to properly track an order 14 as it moves through the brokerage's internal systems 18, certain identifying information is attached to the data record that includes the order 14, such as client and account identifiers and tags. A tag is used to uniquely identify every trade or execution that is processed by the system 10. With this additional information, an audit trail for the order 14 can be constructed so that the progress of the order 14 through the various filters 22, 30, 40 can be monitored. The compliance officer 44 can view the audit trail at any time, to monitor order flow and to ensure that an order 14 is being properly handled. Presently, the compliance officer 44 can call a member of the relevant team for a detailed description of an identified problem, although a brief description can be obtained from the order history and the associated tags. The background process is also responsible for accepting orders via FIX, handing off the orders to the automated trade execution system 10, and if necessary, routing orders to the applicable exchange or filling the orders from inventory.

After an order 14 is processed either from inventory 50 or through an exchange 52, a status record 60 is generated. The status record 60 is passed backwards through the brokerage's internal systems 18 until the status record 60 is passed through the firewall 20 where it can be retrieved by the order management system 16. This way, the client 12 has a complete record of the history of the order 14 and whether the order 14 was successfully filled.

Figure 2:
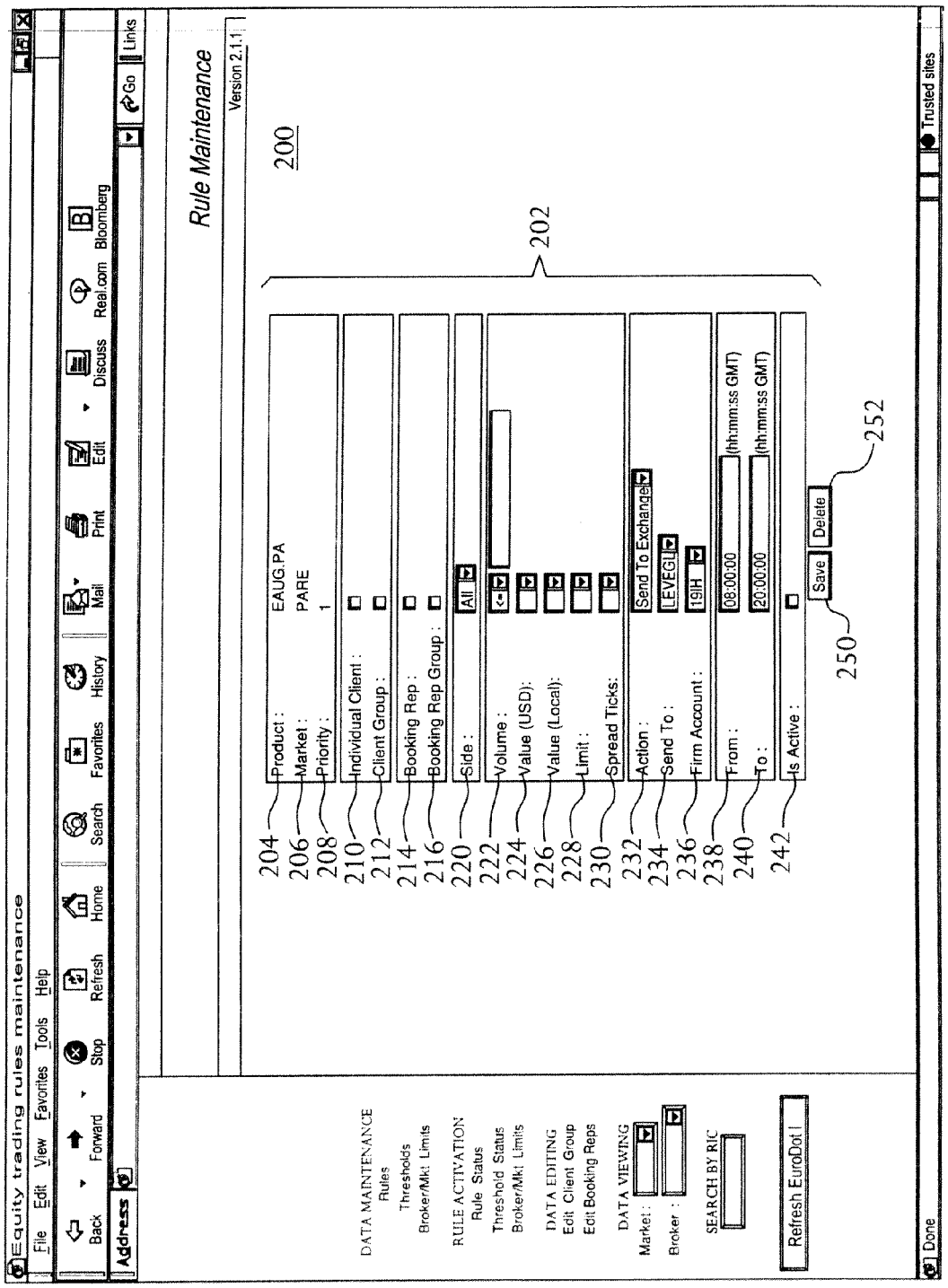
FIG. 2 is a rule definition screen used in connection with the system shown in FIG. 1.

FIG. 2 is a rule definition screen 200 that is used by a trader 32 to define the trader filters 30. (The terms "filter" and "rule" are used interchangeably herein.) A rule 202 is the collection of information that is used to check against an order. A Product 204 is the security that the rule 202 is to be defined for on a particular Market 206. A Priority 208 is assigned to the rule 202 which determines the order in which the rule 202 is applied to the Product 204. If there are multiple rules 202 defined for a Product 204, each rule 202 will have a different Priority 208 and will be tested against the order by ascending priority value.

The checkboxes 210, 212, 214, 216 can be used to determine whether the system 10 should test an order 14 against an Individual Client 210 or a Client Group 212 and/or against a Booking Representative 214 or a Booking Representative Group 216. The grouping of the checkboxes is such that either both the Individual Client 210 and the Client Group 212 are unchecked or only one of them is checked. The same grouping principle applies to the Booking Representative 214 and the Booking Representative Group 216. When the desired Client and/or Booking Representative selection(s) have been made in checkboxes 210, 212, 214, 216, appropriate drop-down lists appear which are populated with the relevant options for the selected checkbox(es) from which the user chooses the desired Individual Client 210 or Client Group 212 and/or Booking Representative 214 or Booking Representative Group 216.

The value for Side 220 allows the trader to determine what type of transactions will be filtered by the rule 202. The Side 220 may be "buy" for buy orders, "sell" for sell orders, or "all" for both buy and sell orders. The Volume 222 is based on the number of shares for a single order. At 224, the value of the order to be filtered can be expressed in United States dollars or, at 226, the local currency. Limit 228 is the limit price on a limit order that can pass the rule 202. A limit order is an order to a broker to buy a specified quantity of a security at or below a specified price, or to sell it at or above a specified price. The Spread Ticks value 230 is used to determine whether the order price is within the specified value of the current market price for the Product 204. The value specified for Spread Ticks is the difference between the bid and the offer. The spread is the current market spread, so that specifying a rule with a spread less than or equal to five (for example), would mean that the order would only be automatically traded if the current bid-offer spread was less than five ticks. The trader may want to limit orders to be automatically processed only when the volatility of the stock is low, i.e., with a small spread. The values for Volume 222, Value 224, Value 226, Limit 228, and Spread Ticks 230 may be defined to be either less than, less than/equal to, greater than, or greater than/equal to (via the drop-down list) the numeric value entered into the field.

The selections for Action 232 determine where an order is sent after it successfully passes the applicable rule 202. The possible values for Action 232 include: "Send To Exchange," where the order will be sent directly to the exchange where the Product 204 is traded; "Fill From Inventory," where the order will be filled from the inventory of the brokerage; and "Send Round Lot, Fill Odd Lot," which is used on exchanges that prohibit orders having a volume that is not equal to a multiple of a given lot size, where the round lot portion will be sent to the exchange and the odd lot portion will be filled from the inventory of the brokerage. The value for Send To 234 directs where the order should be sent if it passes all of the specified criteria. If the Action 232 is "Send To Exchange," then Send To 234 will be a code for the exchange. Send To 234 is not specified for the action "Fill From Inventory". The Firm Account 236 is used when the Action 232 is "Send To Exchange" to properly track the order and credit or debit the appropriate account. The firm account is a tool that enables the company to track its position. Quantities of (positions in) related stocks are usually tracked in the same account.

The From time 238 and the To time 240 are used to set the boundaries for when the rule is operational. Since the system 10 is designed to process orders automatically, it is necessary for the Market 206 where the Product 204 is traded to be open for business. The Is Active checkbox 242 is used to place a rule 202 into and out of an active state. The checkbox 242 can be used to disable a particular rule 202 without having to delete it from the system.

When defining the criteria that comprise a rule 202, a trader can select any combination of criteria; it is not necessary to define values for all of the criteria. For an order to successfully pass a given rule 202, all of the specified criteria need to be satisfied. If the order does not pass one of the criteria of the rule 202, the order fails the rule 202 and will then be passed to a trader 32 for manual processing. After the criteria for the rule 202 have been defined, the user can save or delete the rule 202 by clicking on the appropriate button 250, 252.

Additional filters can be added and can include any quantifiable criteria that a trader would normally evaluate in determining how to process an order. Furthermore, a trader may set limits for the total volume or total value of orders that may be executed against the brokerage's inventory or directed to an exchange.

Figure 3:
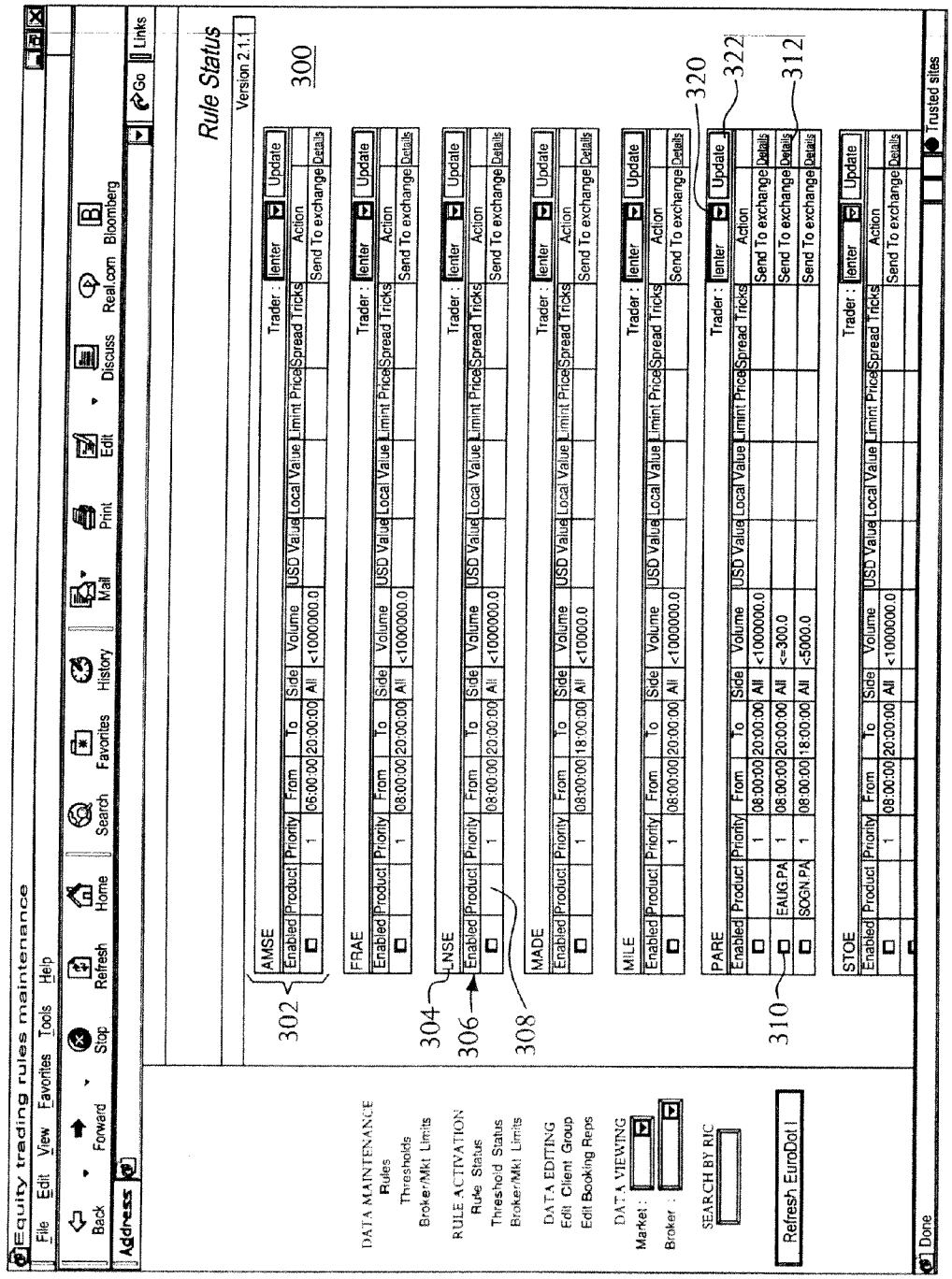
FIG. 3 is a rule summary screen used in connection with the system shown in FIG. 1.

Referring now to FIG. 3, a rule summary screen 300 contains a compact listing of all of the rules 202 that have been defined in the system 10. A rule summary 302 includes the market 304 for which the rule 202 applies and the criteria 306 for each product 308. An individual rule 202 may enabled (e.g., made active or inactive) by toggling the checkbox 310. A user can view the details of a rule 202 by clicking on the Details link 312, which will lead the user to a screen like that shown in FIG. 2. A default trader dropdown list (Trader list) 320 identifies those persons with permissions to execute (i.e., trade) on the respective exchanges. Persons on Trader list 320 can view and edit rules 202. The dropdown list contains all valid traders for the relevant market. A selected trader on Trader list 320 is a person to whom certain orders that do not meet the criteria 306 of a rule 202 will be sent. A rejected order will be sent to all relevant traders for that market, not just the trader selected in the Trader list 320. Persons on Trader list 320 each have a unique trader identifier that is associated with an order that is sent to an exchange. In effect, the automated process of the present invention thus works "on behalf" of the trader. By clicking on the Update button 322, the user saves a changed value of a trader specified in Trader list 320.

Figure 4:
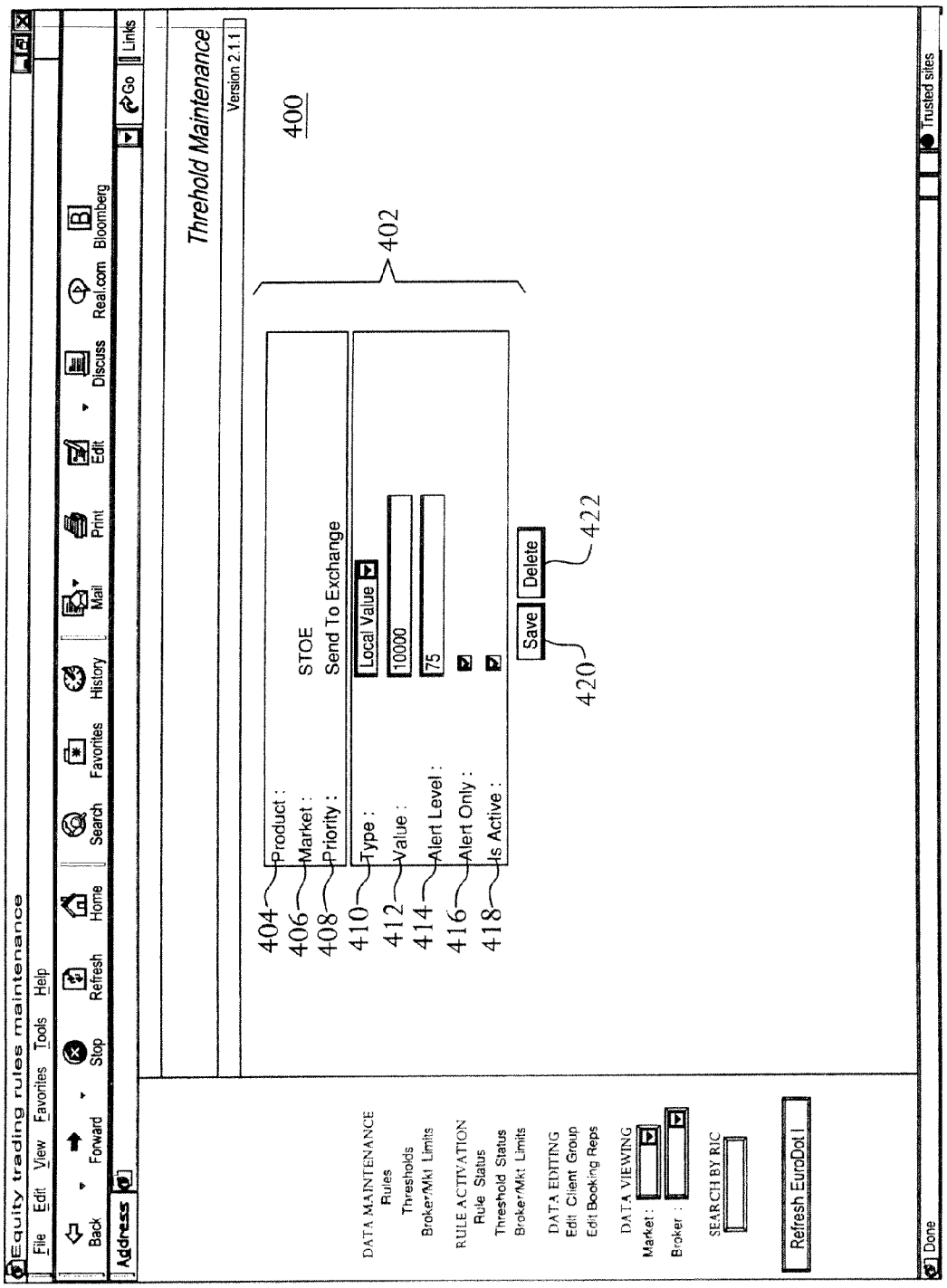
FIG. 4 is an alert definition screen used in connection with the system shown in FIG. 1.

FIG. 4 shows an alert definition screen 400 that permits a user to define when an alert 402 is generated. An alert 402 will notify a trader when a certain condition occurs, as will be explained below. An alert 402 can be defined for a specific Product 404 traded on a Market 406 and by the type of Action 408 to be performed as defined by the rule for that Product 404. Additionally, an alert be created for all products in a market. The Type 410 can include United States dollar value, local currency value, or volume of the order. The Value 412 is a check against which it will be determined whether to trigger an alert. The Alert Level 414 is a percentage value which is used to determine when an alert 402 will be generated, which is when the value in the order specified by the selection of the Type 410 is greater than the Value 412 multiplied by the Alert Level 414.

The Alert Only checkbox 416 is used to determine what type of alert will be sent to the trader. If the box 416 is checked, only an alert will be sent to the trader. If the box 416 is not checked, the system 10 will stop processing the rule that allowed the order that violated the threshold to be automatically traded (i.e., the offending rule will be made inactive). The Is Active checkbox 418 permits the user to selectively activate the alert 402 without having to delete it from the system 10. Once the user has defined the alert 402, the user can either save or delete the alert 402 by clicking the appropriate buttons 420, 422.

Figure 5:
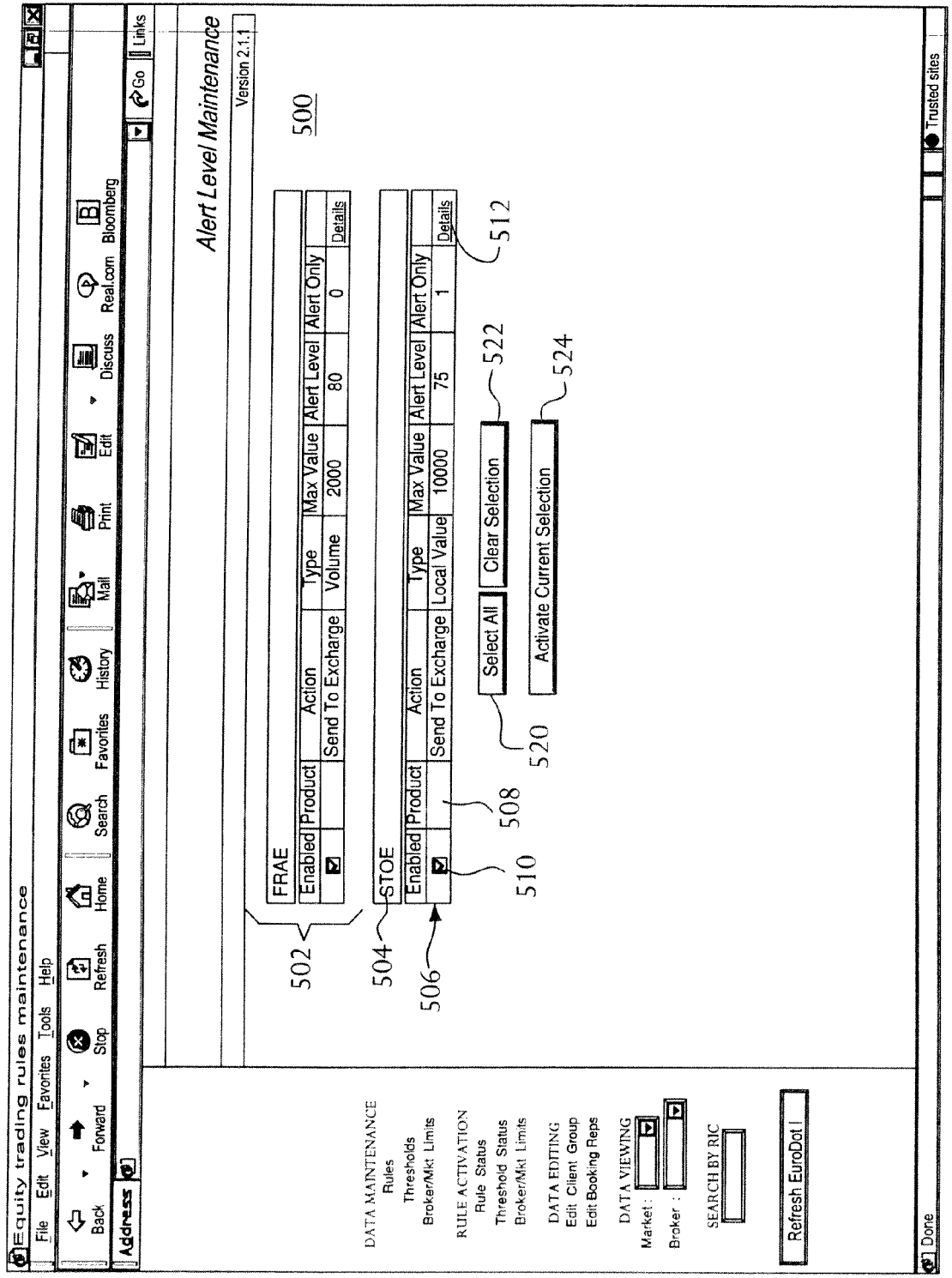
FIG. 5 is an alert summary screen used in connection with the system shown in FIG. 1.

FIG. 5 shows an alert summary screen 500 that displays an alert summary 502 for each alert 402 that has been created by the user. The alert summary 502 is grouped by market 504 and lists the criteria 506 that have been defined for either a particular product 508 or an entire market 504. An Enabled checkbox 510 permits the user to active or deactivate an alert 402 without having to delete the alert 402 from the system 10. The user can also view the details of the alert 402 by clicking on the Details link 512. The Enabled checkboxes 510 associated with each alert summary 502 allow the user to configure a variety of alerts 402. The user can enable all of the alerts 402 by clicking the Select All button 520 or deactivate all of the alerts 402 by clicking on the Clear Selection button 522. Once the user has enabled their desired selection of alerts 402, clicking on the Activate Current Selection button 524 will activate all of the alerts 402 that have been enabled.

Figure 6:
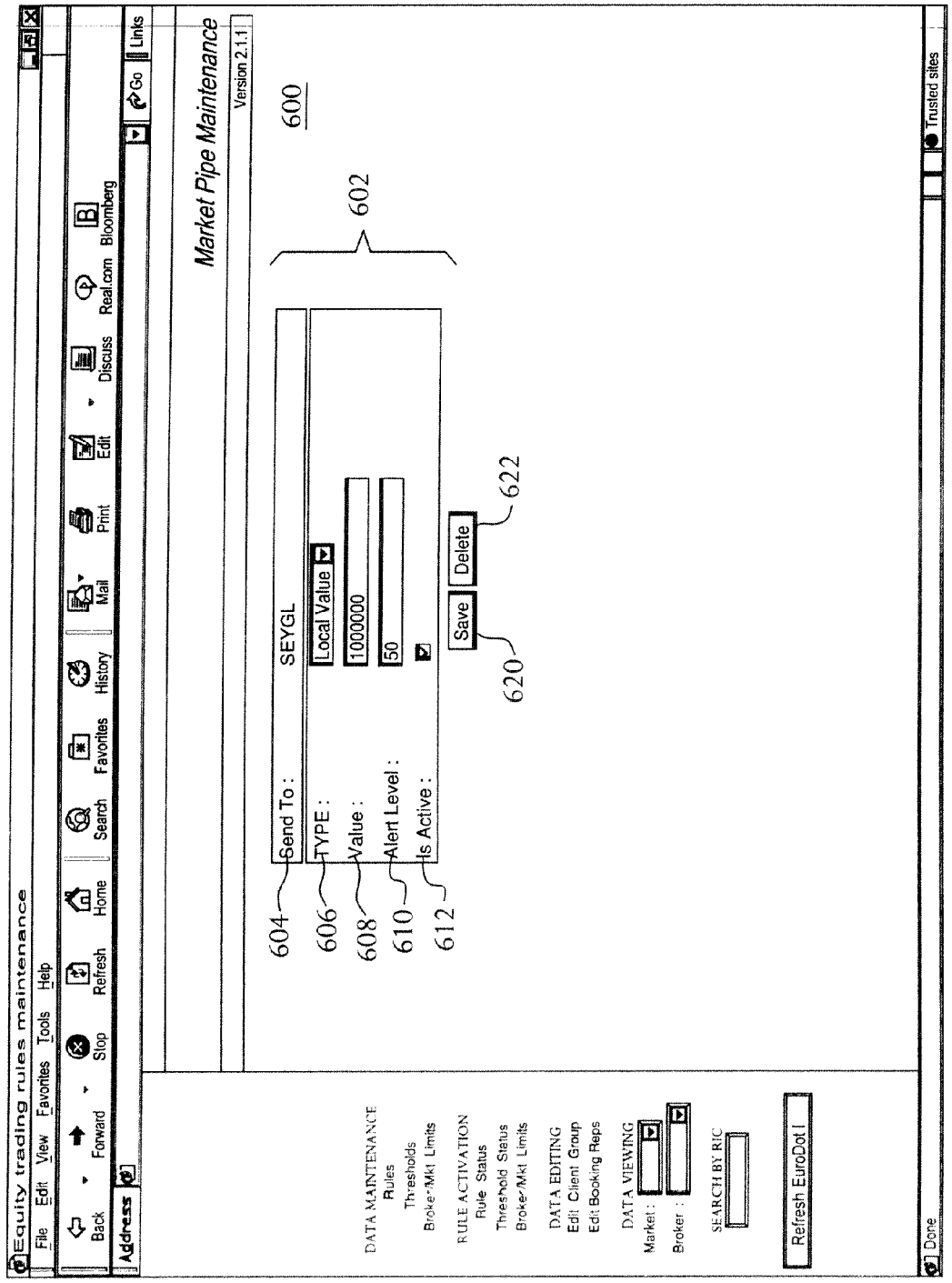
FIG. 6 is a broker alert definition screen used in connection with the system shown in FIG. 1.

FIG. 6 shows a broker alert definition screen 600 that permits a user to define when a broker alert 602 is generated. A broker alert 602 will notify a trader when the thresholds for a given broker have been met or exceeded. This allows the trader to be alerted when a certain amount of business has been done through a given broker. An alert 602 is defined for a specific broker (Send To) 604. The Type 606 can include United States dollar value, local currency value, or volume of the order. The Value 606 is the numerical value that will be tested in order to generate the alert 602. The Alert Level 610 is a percentage value used to determine when the threshold has been exceeded. An alert 602 will be generated when the total value of all the orders generated by the broker 604 specified by the selection of the Type 606 is greater than the Value 608 multiplied by the Alert Level 610.

The Is Active checkbox 612 permits the user to selectively activate the alert 602 without having to delete it from the system 10. Once the user has defined the alert 602, the user can either save or delete the alert 602 by clicking the appropriate buttons 620, 622.

Figure 7:
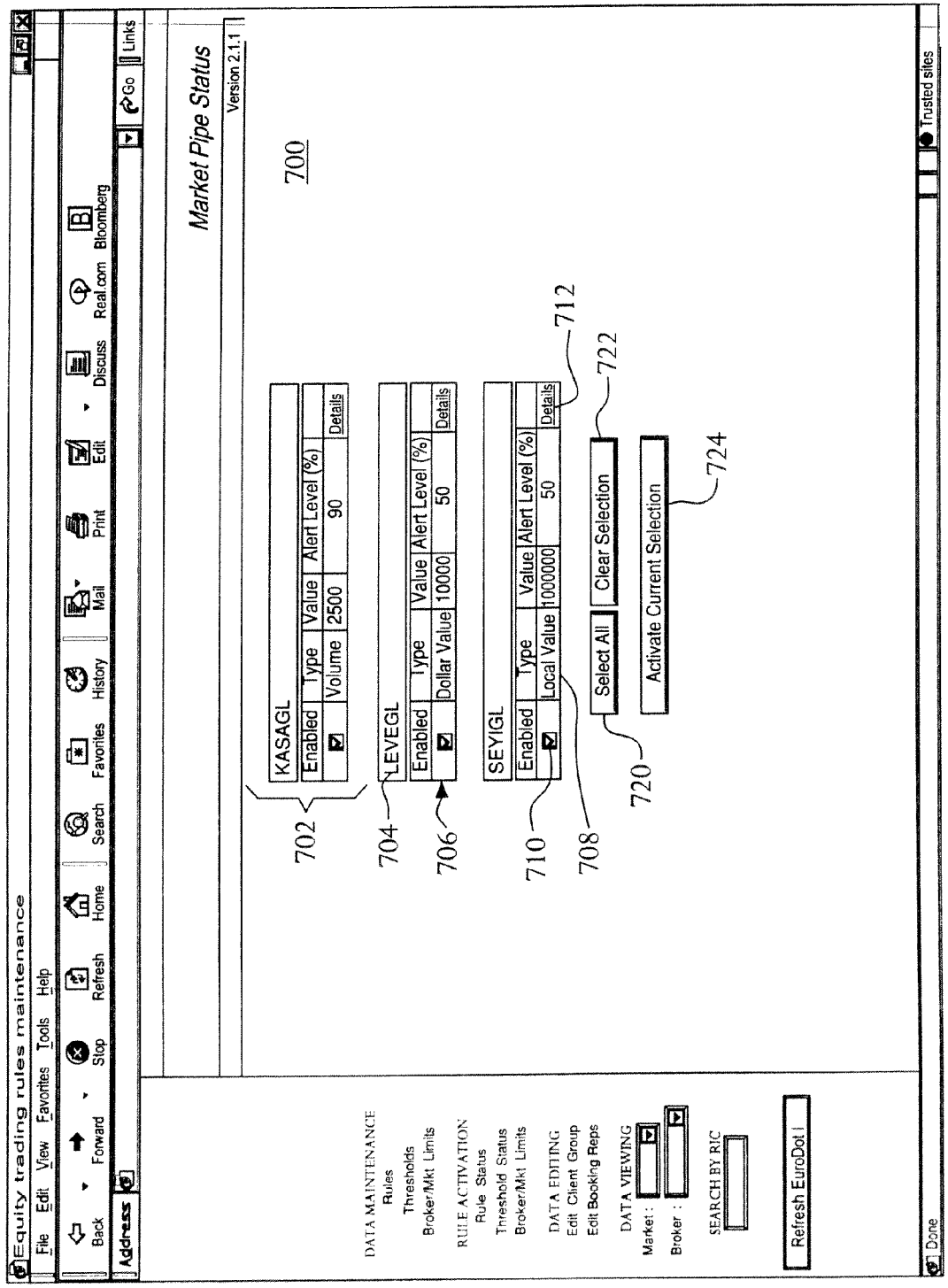
FIG. 7 is a broker alert summary screen used in connection with the system shown in FIG. 1.

FIG. 7 shows a broker alert summary screen 700 that displays an alert summary 702 for each alert 602 that has been created by the user. The alert summary 702 is grouped by broker 704 and lists the criteria 706 that have been defined for the broker 704 and the Type of alert 708 desired. An Enabled checkbox 710 permits the user to active or deactivate a broker alert 602 without having to delete the alert 602 from the system 10. The user can also view the details of the alert 602 by clicking on the Details link 712. The Enabled checkboxes 710 associated with each alert summary 702 allow the user to configure a variety of alerts 602. The user can enable all of the broker alerts 602 by clicking the Select All button 720 or deactivate all of the alerts 602 by clicking on the Clear Selection button 722. Once the user has enabled their desired selection of broker alerts 602, clicking on the Activate Current Selection button 724 will activate all of the alerts 602 that have been enabled.

It will be understood that the embodiment described herein is merely exemplary and that a person skilled in the art may make many variations and modifications without departing from the spirit and scope of the present invention. For instance, the filters exemplified herein can be expanded to include any type of filter that would accomplish the goal to be achieved by that stage of the processing. Moreover, the user screens shown in FIGS. 2-7 are illustrative of a preferred embodiment for constructing the filters and communicating this information to a user of the system 10. A person skilled in the art would be readily able to create many other types of user screens that would collect and display the necessary information contained therein. In addition, the criteria defined for a filter can be any quantifiable criteria that would normally be evaluated by a trader when processing an order. All such variations and modifications are intended to be included within the scope of the invention as defined in the appended claims.

What is claimed is:

1. A computer-implemented method for order execution comprising:
   receiving, at an order management system, data representing orders placed by a client;
   applying filtering rules to the data to determine whether the orders can be automatically executed;
   automatically executing the orders when the data satisfies the filtering rules; and
   transmitting the data representing the order to a broker or a trader when the data does not satisfy the filtering rules.

2. The computer-implemented method for order execution of claim 1, further comprising generating a rule definition screen configured to allow a user to customize the filtering rules.

3. The computer-implemented method for order execution of claim 2, wherein the rule definition screen allows the user to create filters based on volume, total value, or volatility.

4. The computer-implemented method for order execution of claim 1, further comprising generating a broker alert definition screen configured to allow a user to customize when a broker alert should be generated.

5. The computer-implemented method for order execution of claim 1, wherein the data includes a client identifier to uniquely identify the client.

6. The computer-implemented method for order execution of claim 1, wherein the data includes an order identifier to uniquely identify each of the orders placed by the client.

7. The computer-implemented method for order execution of claim 6, further comprising constructing an audit trail, using the order identifier, for each of the orders placed by the client.

8. The computer-implemented method for order execution of claim 1, wherein automatically executing the orders includes filling the orders from inventory or directing the orders to a trading exchange.

9. A securities order execution system, comprising:
   one or more filters to determine whether an order place by a client meets a set of conditions allowing for automatic execution of the order;
   an execution engine to automatically execute the order placed by the client; and a communications network configured to transmit the order to the execution engine to automatically execute the order when the set of conditions have been satisfied and to transmit the order to a trading station for manual execution or to a broker for review when the set of conditions allowing for automatic execution have not been satisfied.

10. The securities order execution system of claim 9, further comprising an order management subsystem configured to receive the order placed by the client.

11. The securities order execution system of claim 10, wherein the order management subsystem encrypts the order.

12. The securities order execution system of claim 10, wherein the order management subsystem validates the client before submitting the order for processing by the one or more filters.

13. The securities order execution system of claim 9, wherein the one or more filters includes a broker filter to determine whether the order creates a broker filter exception and wherein upon determining that the order creates the broker filter exception, the communications network transmits the order along with the broker filter exception to the broker.

14. The securities order execution system of claim 9, wherein the one or more filters includes a trader filter to determine whether the order creates a trader filter exception and upon determining that the order creates the trader filter exception, the communications network transmits the order along with the trader filter exception to the trading station for execution by a trader.

15. The securities order execution system of claim 9, wherein the one or more filters includes a compliance filter to determine whether the order creates a compliance filter exception and upon determining that the order creates the compliance filter exception, the communications network transmits the compliance filter exception to the trading station.

16. A non-transitory computer-readable storage medium containing a set of instructions that when executed cause one or more processors to:
   apply filtering rules to an order to determine whether the order can be automatically executed;
   automatically execute the order when the order satisfies the filtering rules; and
   transmit the order to a broker or a trader when the order does not satisfy the filtering rules.

17. The non-transitory computer-readable storage medium of claim 16, further containing a set of instructions that when executed cause the one or more processors to present a graphical user interface screen to a user, wherein the graphical user interface screen is configured to allow the user to customize the filtering rules.

18. The non-transitory computer-readable storage medium 16, further containing a set of instructions that when executed cause the one or more processors to generate an audit report for the order.

19. The non-transitory computer-readable storage medium 16, wherein the filtering rules include a broker filter, a trader filter, and a compliance filter.

20. The non-transitory computer-readable storage medium 16, further containing a set of instructions that when executed cause the one or more processors to attach a client identifier and an account identifier to the order.

\* \* \* \* \*